Feb. 5, 1929.
E. E. GAMON
1,701,070
WATER METER INDICATOR DRIVE
Filed June 22, 1926
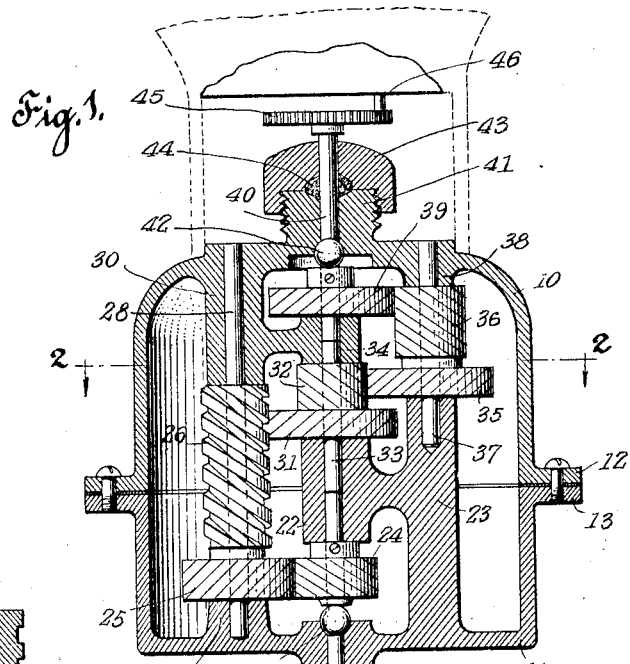
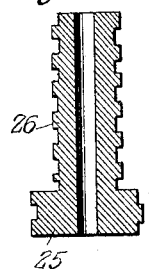
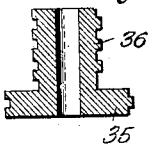
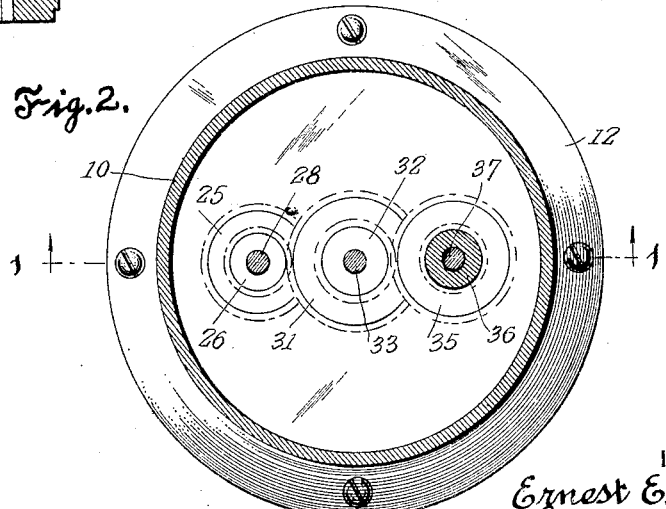
INVENTOR
Ernest E. Gamon
BY
Frank C. Fischer
ATTORNEY Patented Feb. 5, 1929.

1,701,070

UNITED STATES PATENT OFFICE.

ERNEST E. GAMON, OF PRINCE BAY, NEW YORK, ASSIGNOR TO PHOENIX METER COMPANY, OF PRINCE BAY, NEW YORK, A CORPORATION OF NEW JERSEY.

WATER-METER-INDICATOR DRIVE.

Application filed June 22, 1926. Serial No. 117,890.

This invention relates to speed change gear trains and more particularly to gear trains used in connection with the registering devices of water meters.

Hitherto, numerous troubles have been encountered in the operation of translating devices, between meter actuating elements and their indicating devices, one being the difficulty of procuring smooth, even operation, due to grit and dirt from the water seeping through joints and bearings, clogging the gears and causing uneven operation.

It is one purpose of this invention to provide a device that is substantially water-tight thus preventing sediment from coming into contact with the mechanism.

It is a further feature of this invention to provide a device whereby an easy running, smooth reduction of speed is procured between the meter drive spindle and indicator mechanism.

Another object is in the provision of means for controlling the end thrust of the spindles and gears, tending to reduce friction and produce smooth action, and to use gears which are self cleaning in operation.

These and other important objects, which will become apparent as the description progresses, are accomplished by the novel construction, combination and arrangement of parts, hereinafter described and illustrated in the accompanying drawing, forming a material part of this disclosure, and in which:—

Figure 1 is a longitudinal sectional view of an embodiment of the invention, taken substantially on line 1—1 of Figure 2.

Figure 2 is a transverse sectional view taken on line 2—2 of Figure 1.

Figure 3 is a longitudinal sectional view of a unitary worm and gear used in the apparatus.

Figure 4 is a similar view of a pinion and gear used in another part thereof.

The bearing consists of two parts 10 and 11, respectively upper and lower, connected together at a point just below the center thereof by screws passing through extending flanges 12 and 13.

Formed centrally on the lower member 11 is a hub 14, having semi-circular concave seats at its ends to receive spheres 16 and 17 mounted on a spindle 18 journalled in the hub, these elements providing a substantially water-tight bearing.

The outer end of the spindle 18 has fixed to it a collar 19 having a driving arm 20, engageable with a rod 21 given a gyratory motion by the oscillation of mechanism in a water meter, not shown.

The inner end of the spindle 18 is journaled in a lug 22 formed integral with an upright 23 extending within the casing from the lower member 11.

Fixed on the spindle 18 by its hub is a helical pinion 24, the lower side of which abuts against the upper sphere 16.

The pinion 24 meshes with a mating gear 25 having a multiple pitch worm 26 formed integral therewith, the gear and worm being revolubly mounted on a spindle 28 set at its lower end in a lug 29 integral with the casing member 11, and at its upper end in a boss 30 unitary with the upper member 10.

Meshing with the multiple pitch worm 26 is a worm wheel 31 integral with a helical pinion 32 mounted on an intermediate spindle 33 journalled at its lower end in the lug 22 and at its upper end in a similar lug 34 extending in from the boss 30.

The pinion 32 engages a helical gear 35 integral with a helical pinion 36 and is mounted on a spindle 37 set at its lower end in the upright 23 and at its upper end in a projecting lug 38 formed with the upper casing member 10.

The pinion 36 drives a helical gear 39 held by its collar to a spindle 40 mounted at its lower end in the boss 34 to abut the spindle 33, its upper portion passing through a boss 41 having a concave seat in its lower extremity to accommodate a sphere 42 on the spindle 40. The boss 41 is screw threaded on its exterior to engage a cap 43, a packing 44 being between them through which the spindle 40 passes, the spindle carrying at its upper extending end a disc or spur gear 45 and having on its upper face, near its periphery, a pin 46 to actuate the mechanism of the meter clock.

In operation, the bar 21 moving in a circular path revolves the spindle 18 and pinion 24, which in turn drives the gear 25. This action, by way of the integral worm 26 and the driver worm wheel 31 rotates the pinion 32 causing the gear 35 and its integral pinion 36 to revolve; the pinion 36 meshing with the gear 39 rotates the spindle 40 and hence the disc 45, giving the pin 46 a circular movement so as to engage the clock mechanism and so register the amount of water that is passed through the meter.

Because of the upward thrust of the gear 39 on the ball 42 and the downward thrust of the gear 24 on the ball 16, the casing or bearing is obviously made water-tight, the balls or spheres, in conjunction with their seats, acting as valves.

It is also to be noted that all the teeth on the gears, pinions and worm are cut at angles, so that should any foreign matter enter the tooth spaces, the same would be pressed out at the ends of the teeth which are thus self-cleaning in effect, and due to their rolling and sliding motion very little friction is encountered, the stuffing box elements 43 and 45 providing such friction load as may be required to prevent too free action.

The thrust of the pinion 32 and gear 35 is equal in both directions, up and down and is therefore neutral; the same applying between the worm 26 and the gear 31, and the spindles move in opposite directions with entire freedom.

Although the foregoing is descriptive of the invention, it will be apparent that minor changes may be made in its construction, without the exercise of invention or conflicting with the scope of the claims hereto appended.

Having thus described my invention, what I claim as new and desire to secure by Letters Patent, is:—

1. In a translator gear train for water meters, having a casing, an axial spindle composed of upper, lower and intermediate sections, all of said sections being journalled in said casing, the casing having semi-spherical seats, spherical elements on the upper and lower sections of said spindle to rest in said seats acting to receive end thrust therefrom, a pair of shafts mounted in said casing on opposite sides of said spindle parallel therewith, helical gears to transmit rotary motion from the lower section of said spindle to one of said shafts, helical gear connections from the first named shaft to the intermediate section of said spindle, helical gear connections from the intermediate section to the other of said shafts, and helical gear connections from the last named shaft to the upper section of said spindle, the angles of the teeth in all of said helical gear connections being such as to press said spherical elements against their seats.

2. In a translator gear train for water meters having a casing, a plurality of spindles mounted in parallel in said casing, one of said spindles being in three sections, and helical gears on said spindles to communicate motion therebetween, the teeth of the gears on the end sections of the sectional spindle being disposed at opposite angles thereby tending to press the end sections oppositely.

3. In a translator gear train for water meters, a casing, a plurality of parallel spindles in said casing, one of said spindles being composed of sections, valve elements on the end sections of said sectional spindles to make water tight connections with the casing, and helical gears on said spindles to transmit motion therebetween, the gears on the end elements of the sectional spindle being of such angle as to thrust the valve elements outwardly when in operation.

4. A water meter register drive, comprising in combination with a meter mechanism having a casing, a gear train to translate rotary motion from said meter outwardly through said casing, said train including a sectional driving spindle, spherical valves on the end sections of said spindle to close the passages through the casing, and angular teeth on the end sections to press the valves into close relations with their seats whereby leakage into said casing is avoided.

5. A water meter register driver, comprising in combination with a meter mechanism and register, a casing between said meter and said register, a central sectional spindle in said casing, the end sections being engaged respectively with the meter mechanism and the registering device, a pair of lateral spindles disposed in planes parallel to the center spindle, an integrally combined gear and pinion revoluble on each of said lateral spindles, a pinion on the lower section of the central spindle, said pinion meshing with the gear on one of the lateral spindles, a gear on the upper section of the central spindle, a pinion meshing therewith and rotatable on the other lateral spindle, a gear integrally combined with the last named pinion, an integrally combined gear and pinion on the intermediate section of the central spindle, the last named pinion meshing with the last named gear and the gear on said intermediate section meshing with the pinion on the first named lateral spindle, all of said gears and pinions having helical teeth.

6. A water meter register driver, comprising in combination with a meter mechanism and register, a water tight casing between said meter and register, a pair of spindles fixed in said casing, a second spindle spaced parallel thereto, said second spindle being composed of three independent sections, a unitary pinion and gear revoluble on each of the first named spindles, valves on each of the end sections of the central spindle, said valves acting co-operatively with seats in the casing ends through which the sections extend, means for driving the lower section, a helical pinion on the lower section to transmit motion to the unitary gear and pinion on one of said pair of spindles, the angle of said helical spindle pressing the valve against its seat, a unitary gear and pinion on the intermediate section driven by the pinion on the first named spindle and transmitting motion to the gear and pinion on the second named spindle, and a gear on the other section of the central spindle, said gear having its teeth at an angle to press the adjacent valve to its seat.

This specification signed and witnessed this seventeenth day of April, 1926.

ERNEST E. GAMON.